(12) United States Patent
Yakushkin et al.

(10) Patent No.: US 11,561,875 B2
(45) Date of Patent: Jan. 24, 2023

(54) SYSTEMS AND METHODS FOR PROVIDING DATA RECOVERY RECOMMENDATIONS USING A.I

(71) Applicant: Acronis International GmbH, Schaffhausen (CH)

(72) Inventors: Alexey Yakushkin, Moscow (RU); Serguei Beloussov, Costa Del Sol (SG); Sergey Ulasen, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 83 days.

(21) Appl. No.: 17/109,208

(22) Filed: Dec. 2, 2020

(65) Prior Publication Data
US 2021/0182164 A1 Jun. 17, 2021

Related U.S. Application Data

(60) Provisional application No. 62/948,861, filed on Dec. 17, 2019.

(51) Int. Cl.
*G06F 11/30* (2006.01)
*G06F 11/263* (2006.01)
*G06N 20/00* (2019.01)

(52) U.S. Cl.
CPC .......... *G06F 11/263* (2013.01); *G06N 20/00* (2019.01)

(58) Field of Classification Search
CPC .............................. G06F 11/263; G06N 20/00
See application file for complete search history.

(56) References Cited

U.S. PATENT DOCUMENTS

| | | | |
|---|---|---|---|
| 11,119,660 B2* | 9/2021 | Borlick | G06F 11/0751 |
| 2015/0074677 A1* | 3/2015 | Pream | G06F 9/5016 718/104 |
| 2020/0042398 A1* | 2/2020 | Martynov | G06F 3/067 |
| 2021/0034448 A1* | 2/2021 | Raghunathan | G06F 11/079 |

* cited by examiner

*Primary Examiner* — Matthew M Kim
*Assistant Examiner* — Kyle Emanuele
(74) *Attorney, Agent, or Firm* — ArentFox Schiff LLP; Michael Fainberg

(57) ABSTRACT

Disclosed herein are methods and systems for providing data recovery recommendations. In an exemplary aspect, a method may comprise identifying a plurality of storage devices. For each respective device of the plurality of storage devices, the method may comprise extracting a respective input parameter indicative of a technical attribute of the respective device, inputting the respective input parameter into a machine learning algorithm configured to output both a first likelihood of the respective device needing a data recovery and a second likelihood that the data recovery will fail, and determining a respective priority level of the respective device based on the first likelihood and the second likelihood. The method may comprise normalizing each respective priority level, and recommending a device of the plurality of storage devices for a test data recovery procedure based on each normalized priority level.

15 Claims, 3 Drawing Sheets

SYSTEMS AND METHODS FOR PROVIDING DATA RECOVERY RECOMMENDATIONS USING A.I

CROSS-REFERENCE TO RELATED APPLICATIONS

This application claims the benefit of U.S. Provisional Application No. 62/948,861, filed Dec. 17, 2019, which is herein incorporated by reference.

FIELD OF TECHNOLOGY

The present disclosure relates to the field of data recovery, and, more specifically, to systems and methods for providing data recovery recommendations.

BACKGROUND

Backup and disaster recovery solutions allow for the protection of a customer's servers, environments, data, and applications from various types of data corruption, hardware and software issues. The solutions maintain an up-to-date remote copy of data, servers or virtual machines, accessible through a network. In case an issue arises as described above, this remote copy is used to either restore the data (in case of a backup solution), or recover the entire server or environment—starting it from a remote copy on the customer's or a third party's premises.

Due to various reasons, including but not being limited to remote copy corruption, issues with the recovery process, network connectivity issues, inconsistency in applications states, outdated versions of software installed on customer's servers or virtual machines, there is a probability that a recovery will fail.

One of the most reliable ways to detect and resolve potential recovery issues is to perform a test data recovery at a customer's or a third party's site. This can be a test data recovery of a single server, or a test data recovery of the customer's entire protected environment.

Every test data recovery requires a certain amount of resources, which may include manual effort, memory and computing resources, network traffic, and software licenses. Frequent test data recoveries are associated with high costs. Therefore, it is not feasible for a customer to perform a test data recovery or increase test recovery frequencies for all servers in an environment. There is thus a need for an efficient automated way to predict server/environment failure and unsuccessful recovery, and notify the customer of test recovery recommendations.

SUMMARY

To address the shortcomings described above, aspects of the disclosure describe methods and systems for providing data recovery recommendations.

In an exemplary aspect, a method may comprise identifying a plurality of storage devices. For each respective device of the plurality of storage devices, the method may comprise extracting a respective input parameter indicative of a technical attribute of the respective device, inputting the respective input parameter into a machine learning algorithm configured to output both a first likelihood of the respective device needing a data recovery and a second likelihood that the data recovery will fail, and determining a respective priority level of the respective device based on the first likelihood and the second likelihood. The method may comprise normalizing each respective priority level, and recommending a device of the plurality of storage devices for a test data recovery procedure based on each normalized priority level.

In some aspects, the method may comprise determining a total amount of computing resources that can be allocated for test data recoveries over the plurality of storage devices, and allocating, for each respective device, a respective portion of the total amount of computing resources, wherein each respective portion is proportional to the normalized respective priority level of the respective device.

In some aspects, normalizing each respective priority level comprises determining a sum of each respective priority level, and dividing each respective priority level by the sum.

In some aspects, the respective input parameter comprises at least one of (1) results, age and frequency of previous recovery attempts, (2) errors that happened during past backup and recovery activities, (3) device uptime, (4) operating system version on the device, (5) network connectivity attributes, and (6) versions of software installed on the device.

In some aspects, the machine learning algorithm is configured to determine the first likelihood based on a threshold time period, wherein the first likelihood is of the respective device needing the data recovery within the input time period.

In some aspects, the respective device is one of a server and a virtual machine.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for providing data recovery recommendations. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In view of the shortcomings described before, a backup & disaster recovery solution is discussed in the present disclosure. The backup & disaster recovery solution is integrated into a failure prediction system in order to analyze a customer environment's attributes and provide recommendations, using artificial intelligence, on backup & disaster recovery configurations and usage.

More specifically, the probability of unsuccessful recovery is a composite of two other probabilities: (1) a probability that a server will experience a failure and therefore a recovery will actually be needed in some certain period of time (for instance during the next month or year), and (2) a probability that a recovery will be unsuccessful. Both of the probabilities are difficult to calculate as they depend on various external and internal factors, such as the results and frequency of previous recovery attempts, hardware type and age, versions of operating systems and other software installed (for instance a relational database management system (RDBMS), mail server, file server), network connectivity parameters (for instance bandwidth, latency), etc. Therefore, it is proposed to use machine learning methods for analyzing a customer environment's parameters.

Based on the probabilities calculated, a customer is provided with recommendations on what devices in an environment should be protected with backup and/or a disaster recovery solution with a high priority, and what devices in the environment should have a test recovery with a high priority.

Figure 1:
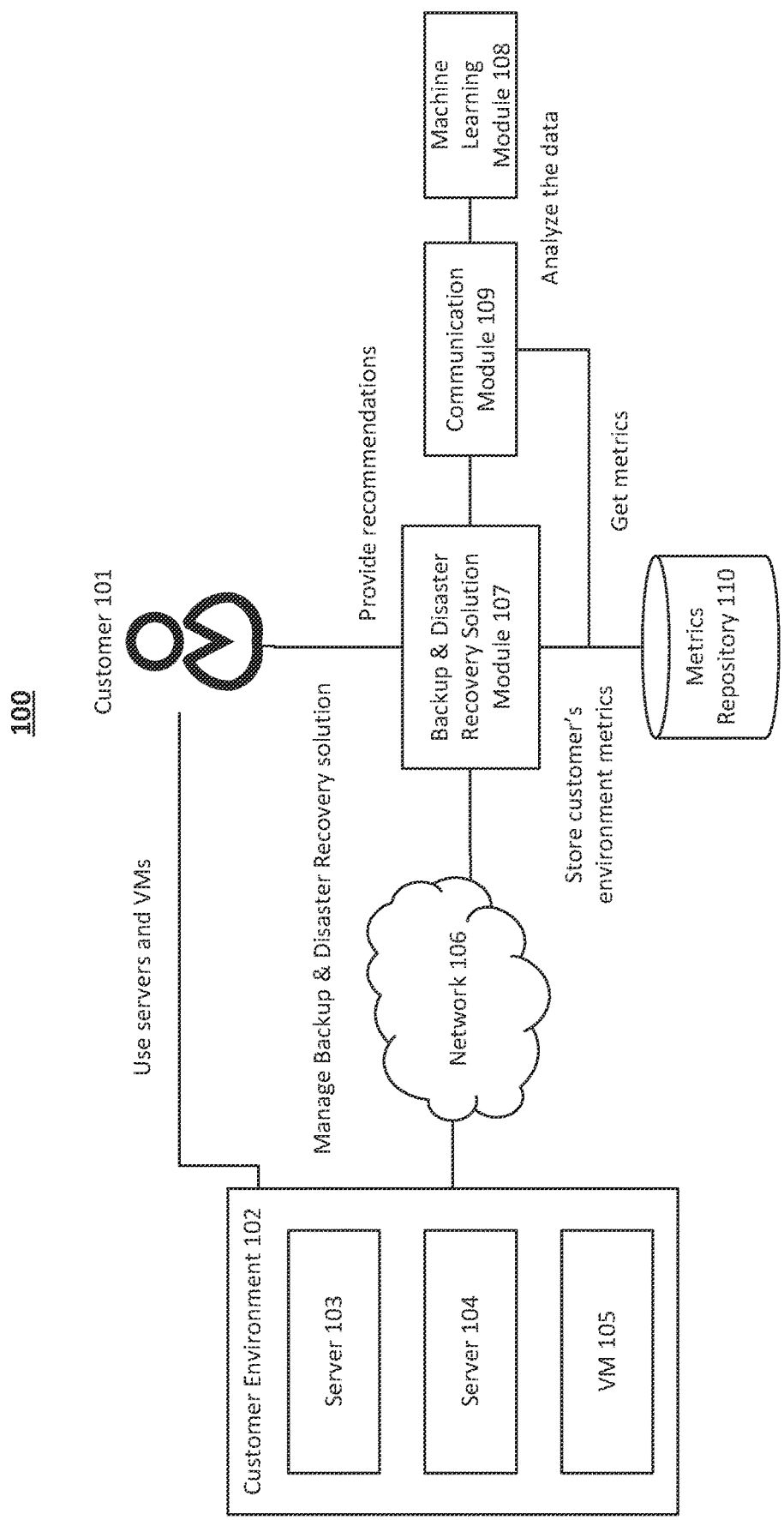
FIG. 1 is a block diagram illustrating a system for providing data recovery recommendations, in accordance with aspects of the present disclosure.

FIG. 1 is a block diagram illustrating system 100 for providing data recovery recommendations, in accordance with aspects of the present disclosure. System 100 comprises customer 101 who uses servers and virtual machines (VMs) in customer environment 102. Customer environment 102 may be a network of storage devices such as server 103, server 104, and VM 105, connected to each other via network 106 (e.g., the Internet). In some aspects, the devices in customer environment 102 may not be connected to each other.

System 100 also includes backup & disaster recovery solution module 107 (henceforth module 107), which generates and provides recommendations to customer 101. Module 107 is connected to metrics repository 110, which stores a customer's activity metrics associated with devices in customer environment 102 (collected over network 106). Machine learning module 108 extracts information from metrics repository 110 via communication module 109. In some aspects, module 107, metrics repository 110, communication module 109, and machine learning module 108 may be stored on different devices. For example, metrics repository 110 may be on a first server, module 107 may be on a client device, machine learning module 108 may be a second server, and communication module 109 may be a thin client on each of the first server, second server, and client device, that orchestrates information exchange between the respective devices. In some aspects, all four components may be present on the same device.

Module 107 extracts information from individual devices in customer environment 102 and stores the information in metrics repository 110. The information may comprise a customer's device and environment parameters that can help to predict an issue or a recovery failure. The set of parameters includes but is not limited to: recovery results, when the last recovery occurred (i.e., age), and a frequency of previous recovery attempts—including partial and full recoveries. The parameters may also include details regarding errors that happened during past backups and recovery activities, classified by error severity (e.g., minor, major, critical). The parameters may also include hardware type, age, and uptime in case of a physical server such as servers 103 and 104, or hypervisor type, version, and uptime in case of a virtual machine such as VM 105. Regardless of whether the storage device is a VM or a physical server, module 107 may also extract and store an indicator of the version of operating system on a device, indicators of the versions of other software installed (e.g., applications, RDBMS, file servers, mail servers), and network connectivity parameters associated with a given device (e.g., bandwidth and latency). In some aspects, metrics repository 110 is regularly updated by module 107 with the most recent data about customer environment 102 and its devices, in order to allow for regular data analysis.

Communication module 109 takes the stored parameters in metrics repository 110 and sends them to machine learning module 108. Metric analysis is conducted through machine learning module 108. Specifically, machine learning module 108 receives a time period and device parameter (s) (e.g., for server 103, 104 or VM 105 or entire environment 102 as an input), and provides the following results as an output based on the aggregated parameters: (1) the probability of an issue in a given device that will require a partial or a full recovery in the time period (for example, during the next month or next year) and (2) the probability that a device already protected by a backup will experience an issue and/or require a recovery failure, and therefore should have a test recovery procedure with a higher priority. Communication module 109 subsequently sends these probabilities for each device evaluated in customer environment 102 to module 107.

In terms of the first probability, which is dependent on an issue in a given device, machine learning module 108 may be trained on a dataset that includes a plurality of data points and a respective plurality for each data point. For example, the dataset may be organized in the following manner:

| Device | Hardware Type | Age (years) | OS Version | ... | Utilized Storage | Failure |
|---|---|---|---|---|---|---|
| 1 | HDD | 5 | 1.2 | ... | 50% | yes |
| 2 | SSD | 1 | 1.25 | ... | 20% | no |
| ... | ... | ... | ... | ... | ... | ... |

In other words, for each device in the dataset, there may be various parameters and an associated failure/success. Machine learning module 108 may learn a set of weights that can be applied to each parameter (e.g., type, age, version, etc.) and combined to yield a classification. This may be achieved in a dot product between a vector of learned weights and each row in the dataset. It should be noted that various machine learning algorithms may be employed by module 108 to achieve the result. For example, module 108 may use linear/polynomial regression or classification ("1" for "yes" and "0" for "no"). Module 108 may expand the data points using techniques such as boosting. In some aspects, module 108 may train using algorithms such as gradient descent.

In some aspects, the probability is a measure of confidence. For example, module 108 may output "yes" for failure and "no" for no failure, along with a numerical value indicative of the likelihood that the verdict is incorrect (or the error percentage). Suppose that module 108 outputs "yes" and an error percentage of 15%. This implies that module 108 is 85% confident that a failure will occur. Likewise, if module 108 outputs "no" and an error percentage of 15%, there is an implication that there is a 15% chance that a failure will occur.

In some aspects, the dataset that module 108 is trained on may include a time length of failure. In other words, all devices in the dataset may have experienced a failure since they were first used by a user. Device 1 may have failed after 7.6 years since the first time it was used and device 2 may have failed after only 3.5 years. Accordingly, module 108 learns a set of weights that can be used to determine how long a certain setup (e.g., of hardware, age, OS version, etc.) can be run before it eventually fails. By guessing the time length until the next predicted failure, module 108 may determine whether a device will fail within a threshold period of time. For example, after learning the weights and estimating when a device is expected to fail, module 108 may predict that a given device will fail in 3 weeks. The threshold period of time may be 4 weeks. Because the predicted failure is within the threshold period of time, module 108 may determine that the probability is 100%. If the next predicted failure is not within the threshold period of time, the probability of device failure within the period of time may be lower. In some aspects, the probability may have an indirect exponential proportion to the difference in the amount of time between the threshold period of time and the predicted time. For example, if the expected failure is predicted to occur in 5 weeks, the probability may be 4 weeks/5 weeks (e.g., 4/5 or 80%). If the expected failure is predicted to occur in 6 weeks, the probability may be 4/6 (e.g., 67%).

In terms of collecting data that can be used to populate the dataset that machine learning module 108 learns from, hardware utilities can provide data on the wear of a particular component. For example, SSDs have built-in counters and timers that indicate the "percentage of health remaining," usually based on read/write cycles. If a threshold is set for such an indicator, for example, 30%, then when it is reached, a transfer of data from the SSD to a new one can be recommended. Likewise, different types of HDDs have different nominal lifespans, which are set by the manufacturers. In general, cheaper disks require more frequent replacement. In some aspects, these indicators may be collected by other monitoring means, independent of the equipment manufacturer: for example, the amount of time in operation under different types of load, etc.

In some aspects, the temperature and electrical power supplied to the equipment can be monitored as well. For example, when there is prolonged application of an increased electrical voltage to any electronic board, it may be a signal that the risk of failure of conductors on the board has increased.

In terms of the second probability, module 108 may be trained on a different dataset that indicates various parameters and whether a recovery failed to take place. The dataset may further include network information (e.g., average speed of uploads/downloads, number of disconnections historically, maximum bandwidth, latency, etc.) in addition to the information included in the initial dataset. Each row in different dataset may represent a recovery attempt, its parameters, and whether the recovery failed or not. An exemplary dataset may be:

| Recovery Attempt | Hardware Type | Age (years) | OS Version | ... | Network disconnections | Failure |
|---|---|---|---|---|---|---|
| 1 | HDD | 5 | 1.2 | ... | 1 | yes |
| 2 | SSD | 1 | 1.25 | ... | 0 | no |
| ... | ... | ... | ... | ... | ... | ... |

As discussed previously, in some aspects, the probability of a recovery failure is a measure of confidence. For example, module 108 may output "yes" for failure and "no" for no failure, along with a numerical value indicative of the likelihood that the verdict is incorrect (or the error percentage). Suppose that module 108 outputs "yes" and an error percentage of 15%. This implies that module 108 is 85% confident that a recovery failure will occur. Likewise, if module 108 outputs "no" and an error percentage of 15%, there is an implication that there is a 15% chance that a recovery failure will occur.

These two probabilities, as determined by module 108, thus dictate whether a particular device needs recovery (because it will fail within a threshold period of time) and whether, if the recovery is performed, the recovery will fail. Based on the received probabilities, module 107 provides recommendations on: (1) what servers/VMs or environments have a higher chance to experience an issue, and therefore should be protected with backup and/or disaster recovery solutions with the higher priority and (2) what servers/VMs or environments that are already protected have a higher chance to experience an issue and/or a recovery failure, and therefore should have a test recovery procedure with a higher priority.

In some aspects, module 107 determines a respective priority level of the respective device based on the first probability/likelihood and the second probability/likelihood. For example, the first likelihood (i.e., the probability of device 1 failing within a given period of time) may be 75% and the second likelihood of a recovery performed by device 1 failing may be 25%. In some aspects, module 107 sums the magnitude of these likelihoods (i.e., 75+25) to determine a value indicative of the priority level (i.e., 100). In some aspects, module 107 sets the priority level to be the greater number of the two likelihoods (e.g., 75). Module 107 may determine the priority level for each device in the plurality of storage devices and then rank the devices from highest to lowest priority level (i.e., with the higher priority level devices being given immediate and more resources to prevent failure).

In some aspects, the priority level may further be based on the importance of the files stored on a device. For example, a user may tag devices to indicate which ones include more important/critical data. Critical data tags may further be defined in a specific backup/retention policy or a service level agreement (SLA). Thus, if two devices have comparable priority levels (e.g., within a threshold amount such as 10%), module 107 may rank the device with critical data higher.

Based on the priorities, module 107 may allocate resources. For example, module 107 may determine a total amount of computing resources that can be allocated for test data recoveries over the plurality of storage devices. These resources may include network bandwidth, processing power (CPU utilization), memory (RAM), etc. Then, module 107 may allocate, for each respective device, a respective portion of the total amount of computing resources, wherein each respective portion is proportional to the respective priority level of the respective device. For example, 10% of the total network bandwidth may be allocated to a first storage device, 20% may be allocated to a second storage device, etc. In some aspects, if the priority level of a device (e.g., 20) is less than a threshold priority level (e.g., 75), no resources may be allocated to the storage device because the device is not expected to fail.

Recommendations are provided by module 107 to customer 101 by means including, but is not limited to, a displaying in a backup & disaster recovery console user interface, generating a report, sending via e-mail, or text message.

Figure 2:
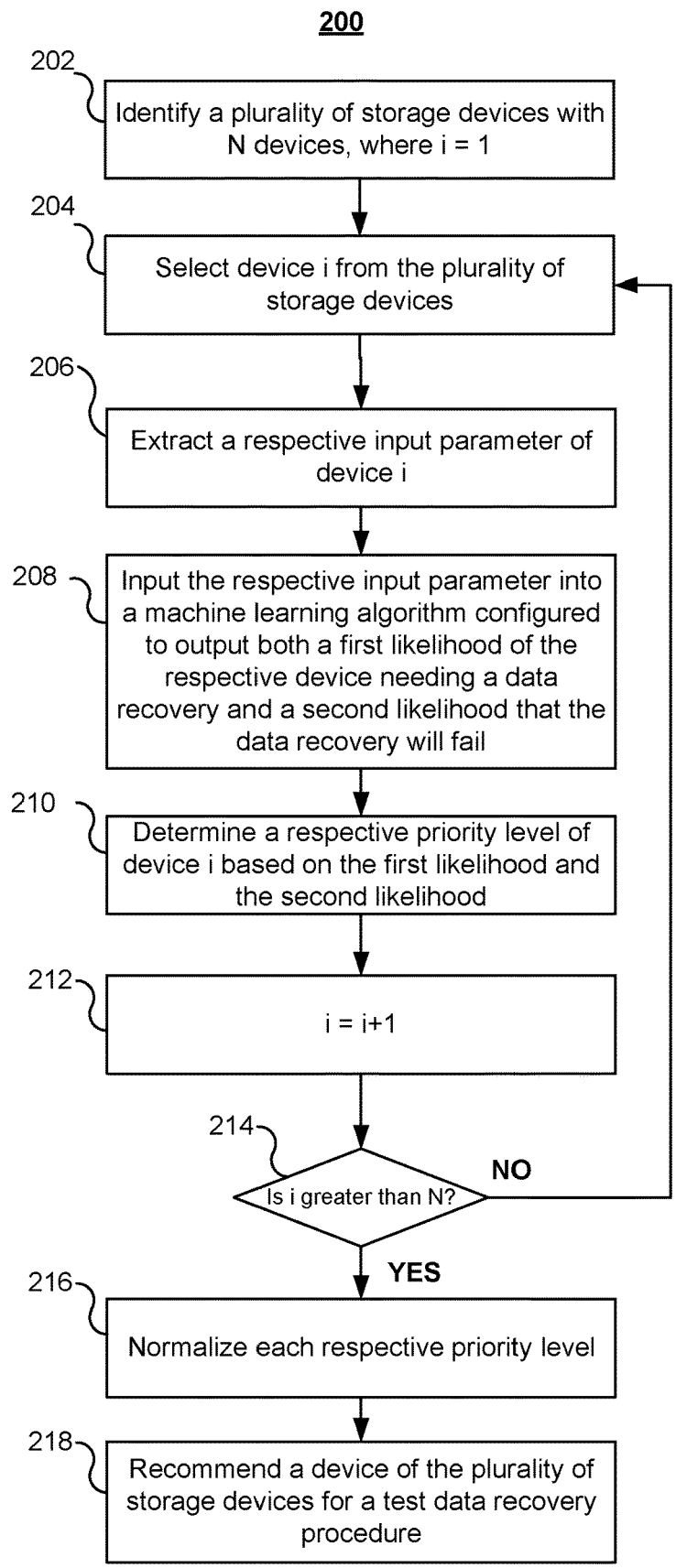
FIG. 2 is a block diagram illustrating a method for providing data recovery recommendations, in accordance with aspects of the present disclosure.

FIG. 2 is a block diagram illustrating method 200 for providing data recovery recommendations, in accordance with aspects of the present disclosure. At 202, module 107 identifies a plurality of storage devices in a customer environment. For example, module 107 may determine that customer environment 102 comprises three devices: server 103, server 104, and VM 105. Module 107 may assign each device an identifier such as a name or a number. For example, module 107 may assign the number "1" to server 103, "2" to server 104, and "3" to VM 105.

At 204, module 107 selects the first device (e.g., device i, where i=1 (hence identifier "1")) of the plurality of storage devices. At 206, module 107 extracts a respective input parameter of device i. For example, the input parameter may be the operating system version on device i. At 208, communication module 109 inputs the respective input parameter into machine learning module 108 configured to output both a first likelihood of the respective device needing data recovery and a second likelihood that the data recovery will fail. At 210, module 107 determines a respective priority level of device i based on the first likelihood and the second likelihood. At 212, module 107 increments the value of i by 1 and at 214, determines whether the value of i is greater than N (e.g., the total number of devices to evaluate in the plurality of storage devices). In the event that more devices remain for evaluation, method 200 returns to 204, where module 107 considers the next device (e.g., server 104).

In some aspects, after all devices have been considered, method 200 advances from 214 to 216 (which may be optional), where module 107 normalizes each respective priority level. For example, if the priority level of server 103 is 50, the priority level of server 104 is 53, and the priority level of VM 105 is 40, module 107 may sum all values (to get 143) to divide each value by the sum to get 35%, 37%, and 28%. Normalization may be important to ensure that the probabilities of a given device are relative to the probabilities of another device. Each parameter that may be assessed by machine learning module 108 may be different, causing the probabilities and scales to fluctuate. Normalization enables module 107 to identify which devices are in greater risk compared to all other devices.

In some aspects, instead of normalization, module 107 may rely on absolute numbers. For instance, module 107 may select servers which will require a recovery with more than 50% probability within the next month, and advise to protect them immediately (if they are not protected yet). Or module 107 may select protected servers for which recovery will fail with more than 30% probability, and recommend to perform a test recovery for such servers.

At 218, module 107 recommends a device of the plurality of storage devices for a test data recovery procedure (e.g., based on the respective priority levels or the normalized priority levels). In some aspects, module 107 may determine a total amount of computing resources that can be allocated for test data recoveries over the plurality of storage devices and may allocate, for each respective device, a respective portion of the total amount of computing resources, wherein each respective portion is proportional to the normalized respective priority level of the respective device (e.g., 35%, 37%, and 28% of processing power).

Figure 3:
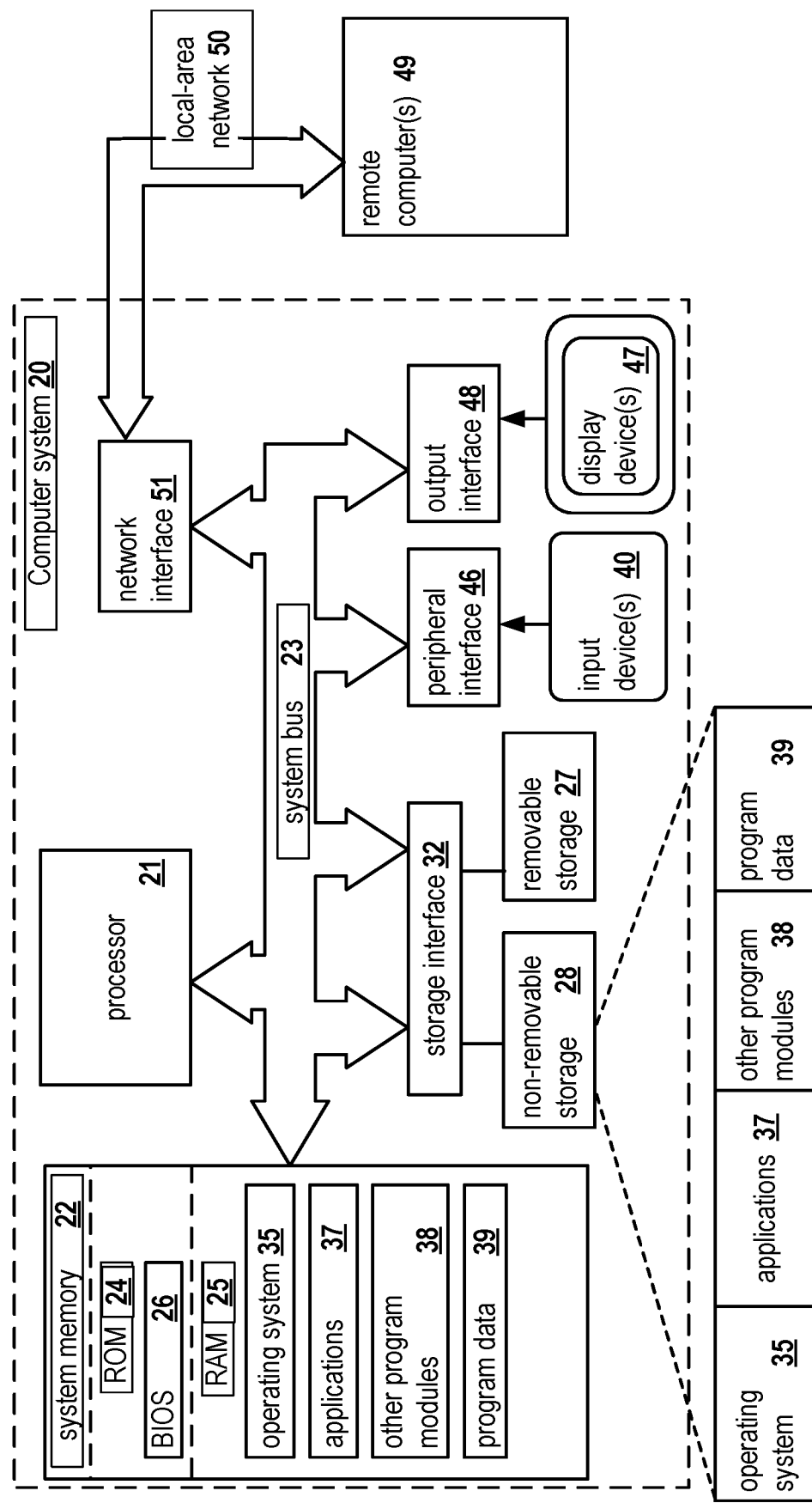
FIG. 3 presents an example of a general-purpose computer system on which aspects of the present disclosure can be implemented.

FIG. 3 is a block diagram illustrating a computer system 20 on which aspects of systems and methods for providing data recovery recommendations may be implemented in accordance with an exemplary aspect. The computer system 20 can be in the form of multiple computing devices (e.g., customer environment 102), or in the form of a single computing device (e.g., server 103, 104, etc.), for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing data recovery recommendations, the method comprising:
   identifying a plurality of storage devices;
   for each respective device of the plurality of storage devices:
      extracting a respective input parameter indicative of a technical attribute of the respective device;
      inputting the respective input parameter into a machine learning module configured to output both a first likelihood of the respective device needing a data recovery and a second likelihood that the data recovery will fail; and
      determining a respective priority level of the respective device based on the first likelihood and the second likelihood;
   normalizing each respective priority level;
   determining a total amount of computing resources that can be allocated for test data recoveries over the plurality of storage devices; and
   allocating, for each respective device, a respective portion of the total amount of computing resources, wherein each respective portion is proportional to the normalized respective priority level of the respective device.

2. The method of claim 1, wherein normalizing each respective priority level comprises:
   determining a sum of each respective priority level; and
   dividing each respective priority level by the sum.

3. The method of claim 1, wherein the respective input parameter comprises at least one of:
   (1) results, age and frequency of previous recovery attempts,
   (2) errors that happened during past backup and recovery activities,
   (3) device uptime,
   (4) operating system version on the respective device,
   (5) network connectivity attributes, and
   (6) versions of software installed on the respective device.

4. The method of claim 1, wherein the machine learning module is configured to determine the first likelihood based on a threshold time period, wherein the first likelihood is of the respective device needing the data recovery within an input time period.

5. The method of claim 1, wherein the respective device is one of a server and a virtual machine.

6. A system for providing data recovery recommendations, the system comprising:
   a hardware processor configured to:
      identify a plurality of storage devices;
      for each respective device of the plurality of storage devices:
         extract a respective input parameter indicative of a technical attribute of the respective device;
         input the respective input parameter into a machine learning module configured to output both a first likelihood of the respective device needing a data recovery and a second likelihood that the data recovery will fail; and
         determine a respective priority level of the respective device based on the first likelihood and the second likelihood;
      normalize each respective priority level;
      determine a total amount of computing resources that can be allocated for test data recoveries over the plurality of storage devices; and
      allocate, for each respective device, a respective portion of the total amount of computing resources, wherein each respective portion is proportional to the normalized respective priority level of the respective device.

7. The system of claim 6, wherein normalizing each respective priority level comprises:
   determining a sum of each respective priority level; and
   dividing each respective priority level by the sum.

8. The system of claim 6, wherein the respective input parameter comprises at least one of:
   (1) results, age and frequency of previous recovery attempts,
   (2) errors that happened during past backup and recovery activities,
   (3) device uptime,
   (4) operating system version on the respective device,
   (5) network connectivity attributes, and
   (6) versions of software installed on the respective device.

9. The system of claim 6, wherein the machine learning module is configured to determine the first likelihood based on a threshold time period, wherein the first likelihood is of the respective device needing the data recovery within an input time period.

10. The system of claim 6, wherein the respective device is one of a server and a virtual machine.

11. A non-transitory computer readable medium storing thereon computer executable instructions for providing data recovery recommendations, including instructions for:
    identifying a plurality of storage devices;
    for each respective device of the plurality of storage devices:
       extracting a respective input parameter indicative of a technical attribute of the respective device;
       inputting the respective input parameter into a machine learning module configured to output both a first likelihood of the respective device needing a data recovery and a second likelihood that the data recovery will fail; and
       determining a respective priority level of the respective device based on the first likelihood and the second likelihood;
    normalizing each respective priority level;
    determining a total amount of computing resources that can be allocated for test data recoveries over the plurality of storage devices; and
    allocating, for each respective device, a respective portion of the total amount of computing resources, wherein each respective portion is proportional to the normalized respective priority level of the respective device.

12. The non-transitory computer readable medium of claim 11, wherein an instruction for normalizing each respective priority level further includes instructions for:
   determining a sum of each respective priority level; and
   dividing each respective priority level by the sum.

13. The non-transitory computer readable medium of claim 11, wherein the respective input parameter comprises at least one of:
   (1) results, age and frequency of previous recovery attempts,
   (2) errors that happened during past backup and recovery activities,
   (3) device uptime,
   (4) operating system version on the respective device,
   (5) network connectivity attributes, and
   (6) versions of software installed on the respective device.

14. The non-transitory computer readable medium of claim 11, wherein the machine learning module is configured to determine the first likelihood based on a threshold time period, wherein the first likelihood is of the respective device needing the data recovery within an input time period.

15. The non-transitory computer readable medium of claim 11, wherein the respective device is one of a server and a virtual machine.

* * * * *